(12) United States Patent
Hoornaert et al.

(10) Patent No.: US 9,710,635 B2
(45) Date of Patent: *Jul. 18, 2017

(54) FIELD PROGRAMMABLE SMART CARD TERMINAL AND TOKEN DEVICE

(71) Applicant: VASCO DATA SECURITY, INC., Oakbrook Terrace, IL (US)

(72) Inventors: Frank Hoornaert, Leefdaal (BE); Mario Houthooft, Melle (BE)

(73) Assignee: Vasco Data Security, Inc., Oakbrook Terrace, IL (US)

( * ) Notice: Subject to any disclaimer, the term of this patent is extended or adjusted under 35 U.S.C. 154(b) by 35 days.

This patent is subject to a terminal disclaimer.

(21) Appl. No.: 14/553,260

(22) Filed: Nov. 25, 2014

(65) Prior Publication Data

US 2015/0082042 A1 Mar. 19, 2015

Related U.S. Application Data

(63) Continuation of application No. 09/789,197, filed on Feb. 20, 2001, now Pat. No. 8,949,608.

(Continued)

(51) Int. Cl.
*G06F 21/00* (2013.01)
*G06F 21/34* (2013.01)
(Continued)

(52) U.S. Cl.
CPC .......... *G06F 21/34* (2013.01); *E21B 41/0042* (2013.01); *G06K 7/006* (2013.01);
(Continued)

(58) Field of Classification Search
CPC ...... G06F 21/34; G06K 7/0013; G06K 7/006; G07F 7/0886; G07F 7/1008;
(Continued)

(56) References Cited

U.S. PATENT DOCUMENTS

| 4,590,365 A | 5/1986 | Okada |
| 5,032,708 A * | 7/1991 | Comerford ............. G06F 21/34 235/441 |

(Continued)

FOREIGN PATENT DOCUMENTS

| AU | 672239 B2 | 5/1994 |
| EP | 0 770 953 | 5/1997 |

(Continued)

OTHER PUBLICATIONS

Canadian Office Action for CA 2,400,440 dated Apr. 14, 2015.

(Continued)

*Primary Examiner* — Mahfuzur Rahman
(74) *Attorney, Agent, or Firm* — RatnerPrestia

(57) ABSTRACT

A digital programmable smart card terminal device and token collectively known as the token device is disclosed. The token device comprises a field programmable token device which accepts a user's smart card. The combination of token device and smart card may then be used for a variety of applications that include user authentication, secure access, encryption. One specific application is that of an electronic wallet. In one embodiment, an electronic smart card terminal includes a smart card reader adapted to receive and communicate with a smart card having smart card data stored thereon; token personality logic programmed based on the smart card data as a token personality subsequent to insertion of the smart card in the smart card reader; and a communications mechanism for communicating authentication data derived from the token personality. Since the smart card terminal only gains its token personality when a smart card is inserted, manufacture and distribution of the terminal on a wide scale is possible.

46 Claims, 9 Drawing Sheets

Related U.S. Application Data

(60) Provisional application No. 60/183,640, filed on Feb. 18, 2000.

(51) Int. Cl.

| | | |
|---|---|---|
| *G06K 7/00* | (2006.01) | |
| *G06Q 20/34* | (2012.01) | |
| *G07F 7/08* | (2006.01) | |
| *G07F 7/10* | (2006.01) | |
| *E21B 41/00* | (2006.01) | |
| *H04L 29/06* | (2006.01) | |

(52) U.S. Cl.
CPC ......... *G06K 7/0013* (2013.01); *G06Q 20/341* (2013.01); *G07F 7/0886* (2013.01); *G07F 7/1008* (2013.01); *H04L 63/083* (2013.01); *H04L 63/0853* (2013.01); *H04L 63/0428* (2013.01)

(58) Field of Classification Search
CPC . G06Q 20/341; H04L 63/0428; H04L 63/083; H04L 63/0853; E21B 41/0042
See application file for complete search history.

(56) References Cited

U.S. PATENT DOCUMENTS

| | | | | |
|---|---|---|---|---|
| 5,325,430 | A * | 6/1994 | Smyth | G06F 12/1408 |
| | | | | 711/E12.092 |
| 5,412,726 | A | 5/1995 | Nevoux et al. | |
| 5,479,512 | A | 12/1995 | Weiss | |
| 5,485,519 | A | 1/1996 | Weiss | |
| 5,521,966 | A | 5/1996 | Friedes et al. | |
| 5,613,159 | A | 3/1997 | Colnot | |
| 5,625,534 | A | 4/1997 | Okaya et al. | |
| 5,679,945 | A | 10/1997 | Renner et al. | |
| 5,802,176 | A | 9/1998 | Audebert | |
| 5,884,292 | A | 3/1999 | Baker et al. | |
| 5,887,131 | A | 3/1999 | Angelo | |
| 5,889,941 | A | 3/1999 | Tushie et al. | |
| 5,937,068 | A | 8/1999 | Audebert | |
| 5,943,423 | A | 8/1999 | Muftic | |
| 5,988,510 | A | 11/1999 | Tuttle et al. | |
| 6,005,942 | A * | 12/1999 | Chan | G06F 21/51 |
| | | | | 235/379 |
| 6,016,963 | A * | 1/2000 | Ezawa | G06Q 20/341 |
| | | | | 235/375 |
| 6,044,155 | A * | 3/2000 | Thomlinson | G06F 21/6245 |
| | | | | 380/277 |
| 6,065,679 | A | 5/2000 | Levie et al. | |
| 6,070,796 | A | 6/2000 | Sirbu | |
| 6,129,274 | A | 10/2000 | Suzuki | |
| 6,145,739 | A | 11/2000 | Bertina et al. | |
| 6,196,459 | B1 | 3/2001 | Goman et al. | |
| 6,234,389 | B1 | 5/2001 | Valliani et al. | |
| 6,351,813 | B1 | 2/2002 | Mooney et al. | |
| 6,393,563 | B1 | 5/2002 | Maruyama et al. | |
| 6,442,532 | B1 | 8/2002 | Kawan | |
| 6,484,260 | B1 | 11/2002 | Scott et al. | |
| 6,488,211 | B1 * | 12/2002 | Everett | G06K 19/0719 |
| | | | | 235/379 |
| 6,550,683 | B1 | 4/2003 | Augustine | |
| 6,564,995 | B1 | 5/2003 | Montgomery | |
| 6,694,436 | B1 * | 2/2004 | Audebert | G06Q 20/04 |
| | | | | 707/999.202 |
| 7,100,199 | B2 | 8/2006 | Genter et al. | |
| 7,606,401 | B2 | 10/2009 | Hoffman et al. | |
| 7,606,931 | B2 * | 10/2009 | Huber | G06K 7/0008 |
| | | | | 235/492 |
| 2002/0129246 | A1 * | 9/2002 | Blumenau | G06F 21/602 |
| | | | | 713/168 |
| 2002/0139861 | A1 | 10/2002 | Matsumoto et al. | |
| 2002/0175207 | A1 | 11/2002 | Kashef et al. | |
| 2002/0178370 | A1 * | 11/2002 | Gurevich | G06F 21/34 |
| | | | | 713/189 |
| 2003/0065653 | A1 | 4/2003 | Overton et al. | |
| 2004/0225894 | A1 * | 11/2004 | Colvin | G06F 21/121 |
| | | | | 726/27 |

FOREIGN PATENT DOCUMENTS

| | | |
|---|---|---|
| GB | 2338329 | 12/1999 |
| WO | WO 95/04328 | 2/1995 |
| WO | WO 97/07448 | 2/1997 |
| WO | WO 98/16908 | 4/1998 |
| WO | WO 99/56429 | 4/1999 |
| WO | WO 99/62037 | 12/1999 |

OTHER PUBLICATIONS

Canadian Office Action for CA 2,400,440 mailed Mar. 20, 2014.
CA Office Action dated Aug. 6, 2012 for CA application No. 2,400,440.
European Search Report for EP 10186185.4 dated May 16, 2012.
Rankl et al., "Handbuch der Chipkarten, Passage," Handbuch Der Chipkarten, Aufbau—Funktionsweise—Einsatz Von Smart Cards, Muenchen: Carl Hanser Verlag, DE, Jan. 1999, pp. 171-177. XP002322130.
Rankl et al., "Handbuch der Chipkarten," Handbuch Der Chipkarten, Aufbau—Funktionsweise—Einsatz Von Smart Cards, Muenchen: Carl Hanser Verlag, DE, Jan. 1999, pp. 595-612. XP002174265.
Rankl et al., "Handbuch der Chipkarten, Mikroprozessorkarten, Speicherorganisation," Handbuch Der Chipkarten, Aufbau—Funktionsweise—Einsatz Von Smart Cards, Muenchen: Carl Hanser Verlag, DE, Jan. 1999, pp. 50-53, 219-227, 394-441. XP002523430.
Menezes et al., "Handbook of Applied Cryptography Key Establishment Protocols," Handbook of Applied Cryptography; [CRC Press Series on Discrete Mathematices and Its Applications], CRC Press Series on Discrete Mathematics and Its Applications, Boca Raton, FL, US. Jan. 1997, pp. 489-541. XP 002304953.
PCT Search Report for Int'l Appl. No. PCT/US01/05331, mailed May 8, 2001.

* cited by examiner

FIELD PROGRAMMABLE SMART CARD TERMINAL AND TOKEN DEVICE

CROSS REFERENCE TO RELATED APPLICATIONS

This application is a continuation of co-pending U.S. Ser. No. 09/789,197 filed Feb. 20, 2001, titled: "Field Programmable Smart Card Terminal and Token Device," which claims priority to provisional application, "Factory to Field Programming and Advances Relating to Digipass 100/800/ Series and Related Tokens", application Ser. No. 60/183, 640, filed Feb. 18, 2000; such applications are incorporated herein by reference.

The present application is related to the following United States Patents and Patent Applications, which patents/applications are assigned to the owner of the present invention, and which patents/applications are incorporated by reference herein in their entirety:

U.S. Pat. No. 4,599,489, entitled, "Solid State Key For Controlling Access To Computer Software";

U.S. Pat. No. 4,609,777, entitled, "Solid State Key For Controlling Access to Computer Software";

U.S. Pat. No. 4,819,267, entitled, "Solid State Key For Controlling Access to Computer Systems And To Computer Software And/Or For Secure Communications"; and U.S. patent application Ser. No. 09/500,533, entitled "Security Access And Authentication Token With Private Key Transport Functionality", filed Feb. 9, 2000, currently pending.

FIELD OF THE INVENTION

The invention relates generally to digital devices and to electronic smart cards typically used for secure applications.

BACKGROUND

A "smart card" is a common term used to refer to a card-like device, typically of the size of a credit card, that includes stored thereon a set of data, which is often specifically related to the bearer or user of the card. Smart cards often contain their data stored by means of magnetic storage (a "swipe strip" or "mag stripe") or in a read-only memory (ROM) or random access memory (RAM), and usually include either a central processing unit (CPU) or a stored set of instructions in order to provide some degree of intelligence. The smart card arena has grown in recent years to include a variety of users and available applications. One such example is the banking world, where banks, brokerages, and other financial institutions have introduced the use of smart cards as electronic wallets for making electronic purchases and electronic payments.

A problem with the traditional type of electronic wallet is that the wallet needs to be charged, i.e., money needs to be 'loaded' into them, prior to use. Currently, one of the methods for loading electronic wallets is by using automated teller machines (ATM's) that have been specially adapted for this purpose, or through the use of special publically accessible dedicated card loading devices. In some cases, specialized public telephones may be used to make a telephone call with the smart card, and also to load the electronic wallet.

The same banks and financial institutions that currently support or anticipate supporting the use of smart cards have already implemented a lot of homebanking services such as phonebanking, PC banking, and Internet banking. A typical desired requirement of these applications is that they not be bound or restricted to being used at a restricted place or time. This is commonly referred to as the "triple A concept"—that the application be accessible anywhere, anytime, anyhow. To allow this flexibility while at the same time ensuring adequate controls and security, these homebanking applications normally require the user to use a digital token—a secure mechanism by which to identify a user or to encrypt the user's communications with the bank.

There is today a large demand to use the existing smart cards already in circulation to support new remote banking applications. This demand is spurred largely by a desire to create a return on investment already made by various banking organizations, but also by a desire to get the user acquainted with his/her electronic wallets and to encourage its use in a variety of different ways at an increasing number and variety of establishments. There also exists today a combined demand to offer to banking customers a homebanking feature together with an ability to remotely load the smart card. Such loading devices are currently available in the marketplace but they are expensive because they need to be specially adapted for each different banks loading or payment scheme, and require specialized applications to be installed within the internal operating software of the device.

To encourage the growth of secure smart card technology within society, and to provide a satisfactory return on investment for those industries, such as the banking industry, which have historically been early adopters of the smart card format and its applications, a method is clearly needed to allow rapid, easy, and low-cost distribution of smart card technology and their associated readers, to the widest available audience or marketplace.

SUMMARY OF THE INVENTION

To satisfy this demand for an easily manufactured and distributable smart card technology the invention provides a field programmable user authentication device, electronic token, or token device. In accordance with the invention, several embodiments of such devices are supported, herein commonly referred to as a "token device."

The inventors have identified at least two different potential users of the invention, depending on their existing infrastructure:

1. Those customers that have already invested in traditional smart card readers but wish to add token functionality in order to support remote access, a feature not implemented in their traditional smart card technology; and, 2. Those customers that may have invested in smart card technology but not in the infrastructure needed (i.e. the terminals, readers and associated server technology) to support distributed users at home.

In the case where the organization has already invested in smart cards and applications but needs a reader for distribution to their customers, the invention provides a generic token device. In one embodiment this generic token device is a self-powered unit that accepts smart cards, and has both an integrated display and keyboard. It can work in a connected or non-connected way. In a non-connected mode the user selects which applications to run and provides inputs (personal identification numbers, etc.) if required. In a connected mode the token device acts as a slave to the users personal computer (PC). The PC makes interrogatories, asking questions, and the token provides answers.

In one embodiment, the invention comprises a field programmable electronic smart card terminal for allowing secure communication between a user and a host service, service provider, or application provided by a service provider, comprising a token personality logic; and, a smart card reader adapted to receive and communicate with a smart card having stored thereon a user identification data, wherein with a smart card received by said smart card reader said token personality logic can generate a token device personality using said user authentication data; and, a communications mechanism for communicating an element of said token device personality to a service or application.

In another embodiment, the invention comprises A method of accessing a secure application, comprising the steps of: providing a generic smart card reader terminal, wherein said generic smart card reader terminal includes: a generic token personality logic, a smart card reader adapted to receive and communicate with a smart card, and, a communications mechanism for communicating said token device personality to a host service; receiving at said generic smart card reader a user smart card having stored thereon a user identification data; generating a token device personality using said user authentication data; and, accessing a secure application using an element of said token device personality.

In a further embodiment, the invention comprises a method of allowing a user secure access to a service provider application, comprising the steps of: distributing to a plurality of users a plurality of generic smart card reader terminals, wherein each of said generic smart card reader terminals includes:

a generic token personality logic, a smart card reader adapted to receive and communicate with a smart card, and, a communications mechanism for communicating said token device personality to a host service; receiving at said generic smart card reader a user's smart card having stored thereon a user identification data; allowing a user to generate a token device personality using said user authentication data; and, allowing said user to access a secure application provided by a service provider, using an element of said token device personality.

DETAILED DESCRIPTION

Traditional user access devices which are used for accessing financial systems, such as point of sale terminals, electronic tokens, trusted wallets, and banking cards, utilize a long and complex method of distribution. This is because a central system or service provider must keep track of the different secrets and/or personal identification numbers (PIN's) that are distributed to which customer and on what terminal. One target market for the present invention are the owners of such systems that are either originally smart card based, or are token based but the owner wishes to switch to a smart card.

An advantage of the present invention is that it can take advantage of such existing infrastructure without requiring the new installation of terminals. The smart card reader or smart card terminal provided by the invention can be used as a token that needs no programming of user-specific secrets. As used herein, the terms "user" and "cardholder" are used to refer to the user of the smart card or token device. This is typically an end-user or client of a bank or financial institution who has been issued with a personal smart card. As used herein the terms "system owner" and "service provider" are used to refer to such banks, financial institutions, and other vendors who provide a service to the cardholder, while the terms "service", "host service", and "application" are used to refer to the various services or applications a service provider may make available to the user. Instead of preprogramming, the secret values used for authentication and user-host communication are instead derived from external parameters, such as identification data or secret values stored on the smart card itself (for example the card's serial number). The advantage of this procedure is that the smart card terminal can be shipped and put into distribution directly from the factory. A subscribing user gets his terminal and enters his card and the parameters, and secrets are set accordingly, creating a token. The invention is intended to be a mass product, which can be factory pre-set for a specific system owner or service provider such as a particular bank or financial institution. Such pre-sets are collectively referred to herein as a "scheme" which allows different banks to personalize the working of their own token system. The delivered terminal/token device for each system owner are all identical and are intended to go straight to the points of distribution. This provides a great advantage in speed and ease of distribution over prior methods.

Personalized Token

Figure 1:
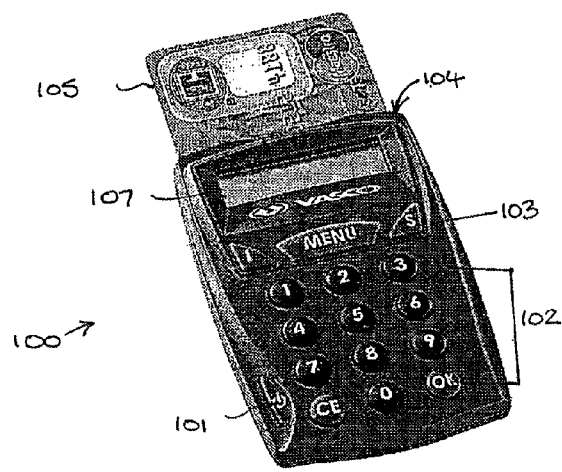
FIG. 1 is an illustration of a token device in accordance with an embodiment of the invention.
Figure 2:
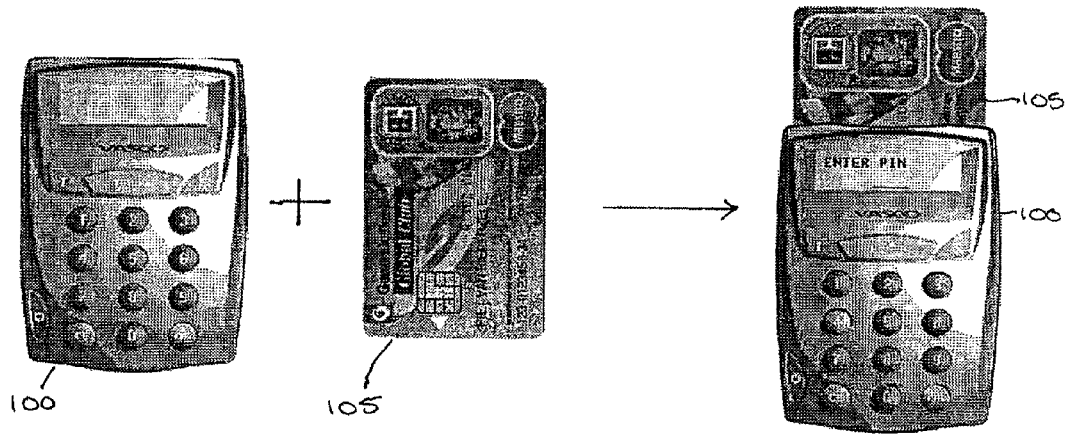
FIG. 2 is an illustration of a smart card and token device in accordance with an embodiment of the invention.

The invention may be considered the first of a new generation of intelligent, unconnected smart card readers or terminals, which offer the strong authentication functionality of a token based on smart card security. Strong authentication itself is traditionally based on a combination of at least two factors present at the same time: something the user has, something they know, and possibly something they are. FIG. 1 shows an example of a smart card terminal in accordance with an embodiment of the invention. As shown therein the smart card terminal 100 includes an ON/OFF switch 101, a keypad 102, a set of function keys 103, a display 107, and a smart card reader 104, adapted to receive and communicate with a smart card 105. FIG. 2 illustrates the operation of the terminal device, in which the smart card 105 may be inserted into, and removed from the terminal 100.

In accordance with an embodiment of the invention, the user may already have a secure smart card and knows the PIN associated with that smart card. When the smart card is inserted into the smart card terminal, it transforms the terminal into an electronic token device via a predefined set of instructions or protocol agreed with and approved beforehand by the smart card issuer or system owner. From then on the terminal (now more correctly considered an electronic token device) can be used for a variety of secure applications. For example, it can be used to log-on remotely to computer networks, to generate one-time passwords, accept challenge messages and calculate responses, and even generate MAC (media access control) signatures over messages. As used herein the terms "terminal" and "token device" are used to refer to the same physical device of the invention and to the two instances of that device—one as a smart card reader, and the other as an electronic token device. Any data entry can be performed using an included keypad, while user action is guided using messages on an LCD display. Since it can operated in an unconnected mode the token device can be used on any platform (a personal computer, phone, Internet, kiosk, etc) at any time, and from any place.

Banks currently have millions of smart cards in the field for combined electronic purse and debit functions. At the same time they use tokens for strong user authentication to grant access to their phone, home or Internet banking channel. Both of these systems require an identical process of personalization of the card or token, shipment, PIN mailers, a host system and a helpdesk. The invention now removes this logistical burden and focuses on the smart cards already delivered to the bank customers. Terminal/ token devices created in accordance with the invention may be manufactured according to the "factory-to-field" concept. In this sense they may all be identical even up to delivery to the bank agency. There is thus no need to personalize the terminal before it is actually handed over or shipped to the customer. At that point the customer initializes the terminal, transforming it into a token device, by inserting their own personal smart card. The token device derives all required keys according to the rules set up by the card issuer and embedded directly in the unalterable processor mask of the terminal unit. If the card is removed from the token device, all secrets are immediately erased, and the device reverts back to being a regular smart card terminal (i.e. it no longer acts as a token).

Figure 3:
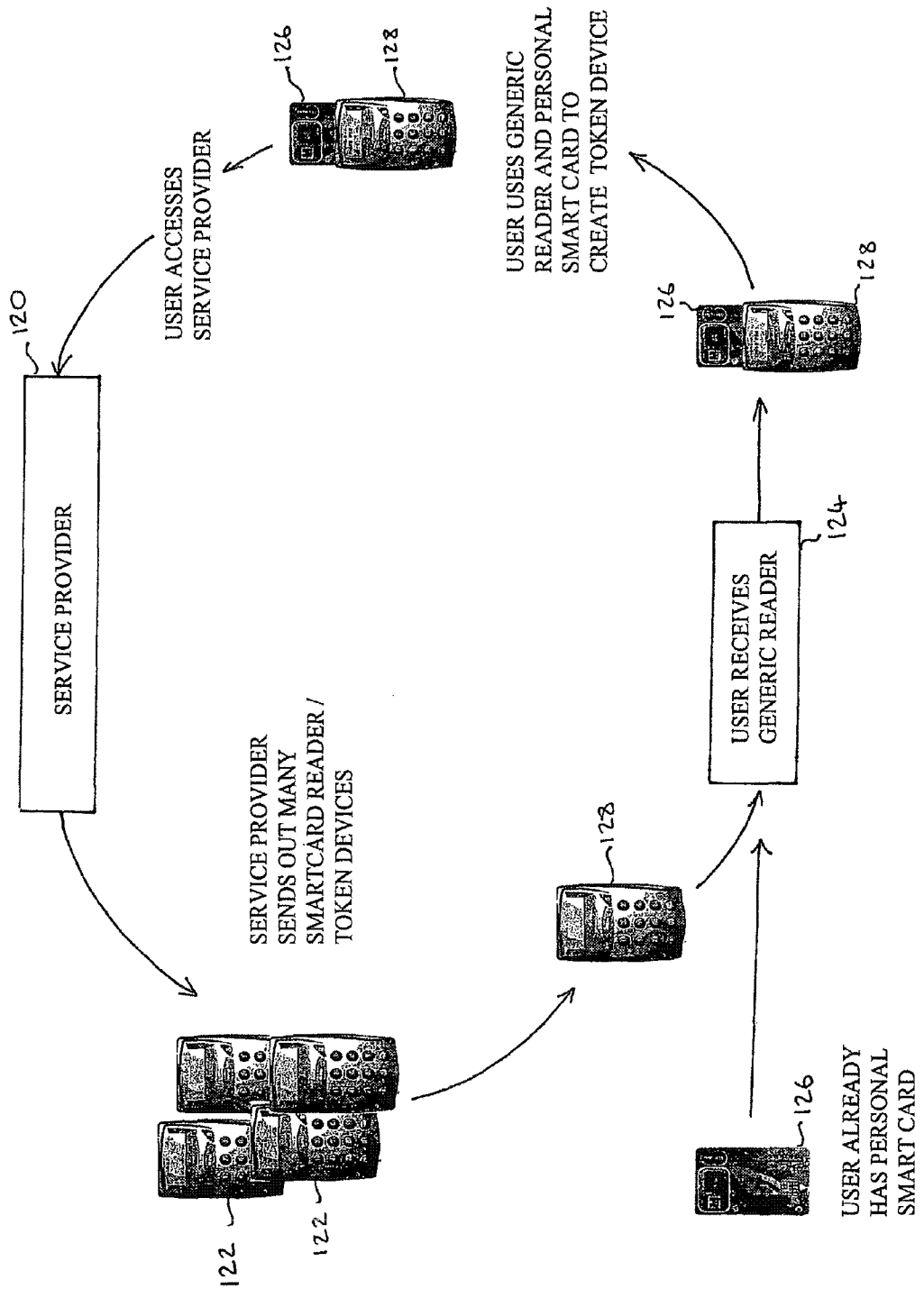
FIG. 3 is an illustration of a token device deployment process in accordance with an embodiment of the invention.

FIG. 3 illustrates schematically the process in which the smart card and terminal are used by a user to access a service provider, such as a bank or other financial institution. A service provider 120 distributes a wide number of low-cost smart card terminals to the public, or at least to a large subset of the population who may be interested in using the services of the service provider. A particular user 124 receives one of the smart card terminals, and inserts their own personal smart card 126 into the terminal to create a personalized electronic token 126/128. This token is then used to access the service providers network, or services.

Figure 4:
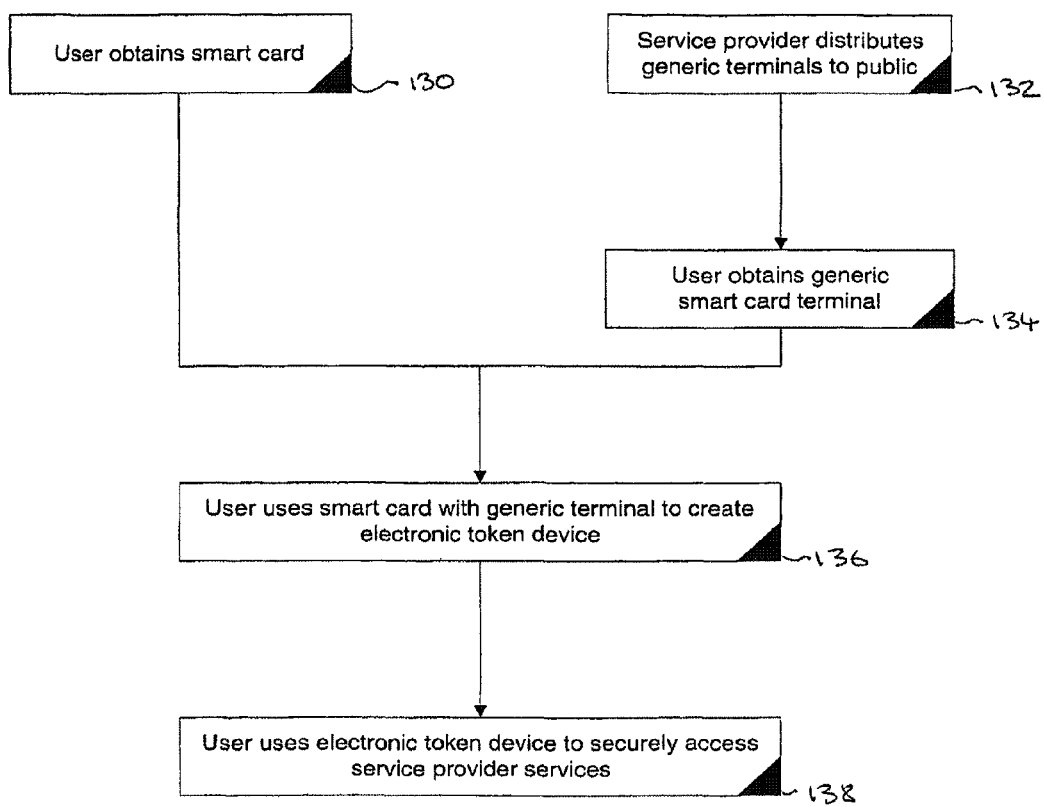
FIG. 4 is a flowchart of a token device deployment process in accordance with an embodiment of the invention.

The steps required to accomplish this process are shown in FIG. 4. As shown therein a user obtains a smart card (step 130) while a service provider distributes generic terminals to the public (step 132). The user obtains one of these generic terminals (step 134) and uses it together with his/her smart card to create the token device, and to generate an electronic token (step 136). This token is then used to access the services provided by the service provider, either locally (in unconnected mode with the application stored on the smart card terminal itself), or remotely, via an intermediate client computer and host server (step 138).

In the general networking world, public key infrastructure (PKI) encryption solutions are becoming more common but they require a more expensive, connected smart card reader with all related problems of drivers and connections. But the connection of the reader is not always possible and even not required for just granting remote access to users. Still they have a huge investment in smart cards that has to be re-used. With the invention, the smart card may be used for the first time at all network entry points. The innovative terminal device replaces the tokens that have to provide secure remote access to Internet, phone banking and other banking services. The terminal provided by the invention can be used in combination with existing smart card schemes—the combination of both becomes unique without requiring the troublesome personalization of the tokens by the service provider.

The invention creates a win-win situation for the service providers such as banks, their customers, and to network owners who have already invested in smart cards. The banks win because the inventions terminal unit allows their customers to use their smart card for almost every contact with their bank. They also get a reasonably priced smart card reader that can be delivered in volume and that needs no specific programming. The cardholder wins because his smart card becomes his standard interface with his bank. At the same time he has an integrated balance reader at his disposal, and in the unfortunate case that his terminal/token device stops functioning, he can just walk to the bank and get a replacement unit without having to wait for a newly programmed one with a new PIN to be delivered. The network owner, who already invested in smart cards and even smart card readers, can now offer a solution to his user who are either unconnected or need secure remote network access.

The biggest advantage of the invention is the fact that smart cards and tokens are no longer considered rival products when it comes to promoting their advantages. From now on they can live in a symbiotic way profiting from the intrinsic security of the smart card combined with the advantage of unconnected tokens. These two key elements permit secure network access from anywhere, anyhow and at anytime, without being limited in access methods and platforms. This allows network operators to address the widest possible users group without any discrimination. The security is also fully in the hands of the issuer as no security parameters and/or key programming and distribution is needed. Every secret that is used is either predefined in the card or derived from parts of that smart card in a secure and unalterable way.

Modes of Operation

In accordance with an embodiment of the invention, the token device may operate in any of three different phases: an initial programming phase, an operational phase, and a battery fail phase.

In the initial programming phase, the token device is shipped to the system owner. As shipped, it contains all required parameters for the system owner in a built-in read only memory (ROM). When batteries are inserted, the token is reset and asks for the smart card to be installed during a 10-second boot up period. When the unit is reset at any later time, it will again ask for a smart card to start the initialization. This phase can also be repeated by removing the batteries from an operational token device.

In the operational phase the token device can be used in either a connected or unconnected mode; and whether it has a smart card inserted into its reader or not. Depending on these parameters the behavior of the token device will automatically change from one of dumb smart card reader to electronic token device, and from an unconnected electronic wallet, to a connected client. In one embodiment the token device becomes fully operational once a smart card is introduced for the first time and a pre-defined initialization phase is successfully executed. In unconnected mode the token device supports time and/or event-based dynamic passwords, challenge/response, and signatures, and acts as an electronic token or electronic wallet in it's own right.

Figure 5:
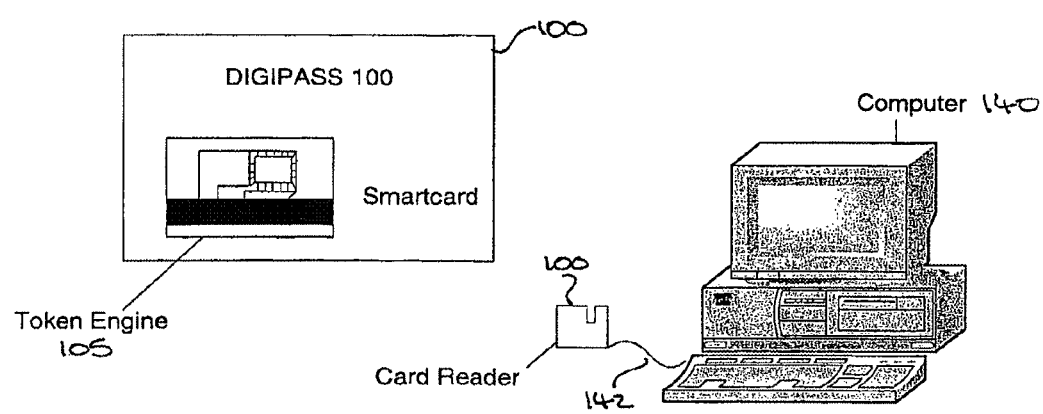
FIG. 5 is an illustration of a token device connected to a personal computer in accordance with an embodiment of the invention.

These different modes are described in further detail below. In connected mode, as illustrated in FIG. 5, a token generating application runs on the user's personal computer (PC) 140 while the token device (the combination of smart card terminal 100 and smart card 108) acts as a slave device, connected to the PC by a serial or equivalent connection 142. Depending on the complexity, certain firewall-like filters can be installed into the token device or the token application that may be used to accept certain addresses in the card, or specify certain field length, sequence of operations, specific commands, etc.

When the voltage level drops under a predefined level, the token device enters a battery fail phase, and signals a "battery low" warning. The battery must then be replaced in order to keep the RAM contents intact.

Customer Use

As any prospective banking, financial, or equivalent organization will wish to distribute the smart card terminal/token device at the lowest possible cost to their customers, it is important that as many people as possible can use that one token. A modern household may have a variety of different cards—perhaps one or two for each person in the household. Hence the token device is designed such that many members of a family can use it, while the smart card activates each users own personal secrets. It will be evident that the invention is not limited to home applications but instead that it's features, and particularly it's ability to offer a group of people a common security interface, makes the invention useful in many commercial or industrial settings.

Other than the original electronic wallet applications, space may be reserved in the token device for future applications such as electronic ticket reservation, user authentication, secure access control, etc. Each of these applications needs different attention and may utilize different ways of handling the secrets. One embodiment of the present invention may be implemented by presetting the number of applications per user (4, for example). In the 4-limit application embodiment, a token device may have up to 16 applications which can be defined as coexisting beside each other. If so required, these 16 applications can also be used by a single user, or alternatively two individual users may use up to 8 applications. Any alternative combination of users and applications may be implemented.

In one embodiment, messages are defined to guide the user through the use of each application. Messages may be limited to save resources. For example, in one embodiment a total of 64 messages may be programmed over all 16 applications. These messages remain in one block of memory. The messages may be stored in ROM and shared across applications, or may be stored in the applications themselves. Alternatively, additional resources may be provided for more extensive messaging. The messages can be updated as a full block by use of a program smart card.

In one embodiment, the original software used with the smart card is already factory programmed during manufacturing into a programmable Read Only Memory (ROM) area of the token device. When the token device receives a hardware reset, this initial program is copied from ROM storage to the first partition in the RAM Memory and executed.

In accordance with one embodiment of the invention the token device is upgradeable. However, as new applications arrive, not everybody may want to subscribe. Therefore, in one embodiment, the token device includes a memory management system that is block-based and that can be managed from an upgrade smart card. The block size is defined in such a way that the memory is used in an optimal fashion. For example, certain applications may use several memory blocks. The token device operating system will automatically put the new application into the available position. If insufficient memory space is available for this process then the user will be warned on the display. A new application or an upgrade can be set to delete a previous version. The upgrade smart card should in this case contain the file header, the version number and the instruction to delete a previous version if found.

On-line upgrades are mainly directed toward connected applications for the token device and fall within the responsibility of the application or system owner i.e., the bank, financial institution, or other organization which has developed the application. In one embodiment, for security purposes, an on-line upgrade can only be used to upgrade only those token applications residing on the PC, and not the applications residing in the memory of the token device.

Figure 7:
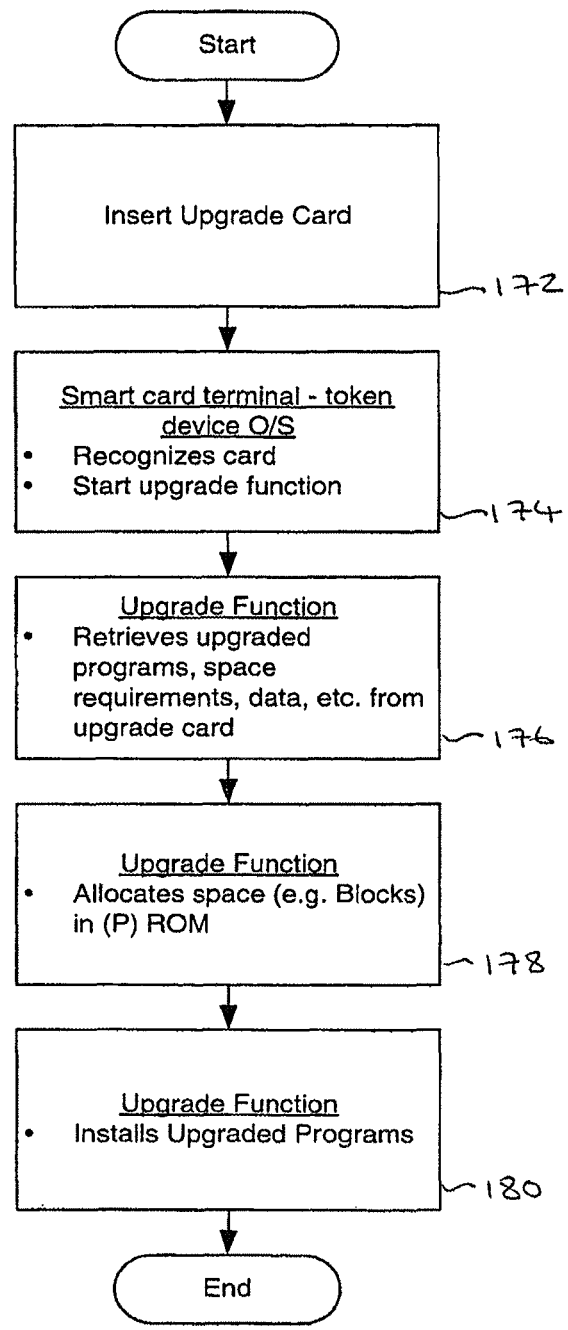
FIG. 7 is a flowchart of a token device upgrade process in accordance with an embodiment of the invention.

Token device applications can be also upgraded or expanded off-line by using a program smart card. In one embodiment, this card needs a specific operator personal identification number (PIN) and is not intended for distribution to the end-user. To guarantee the authenticity of the token device and of the upgrade smart card, an initial mutual challenge/response mechanism can be used, or if available a "certified read" mechanism can be used to authenticate both devices. Users wanting to upgrade or subscribe to a new service may also visit a service point of the system owner with their token device. FIG. 7 shows a flowchart of one such upgrade process in accordance with the invention. The upgrade card is inserted into the reader (step 172). The reader hardware recognizes the upgrade card and starts an upgrade function (step 174). Upgrade data, programs etc. are loaded from the upgrade card into the memory of the smart card reader/token device (step 176), and stored in an appropriate ROM memory block (step 178). Upgraded applications are then accessible by the user (step 180).

External Device Characteristics

In one embodiment the housing for the token device has a portrait design for easy handheld use. The length and width is approximately the same as a standard credit card. The thickness largely depends on the thickness of an optional Universal Serial Bus (USB) connector used to connect the smart card terminal or token device to a user's personal computer. Other housing types and shapes may be utilized while remaining within the spirit and scope of the invention. The token device may utilize any convenient electronic packaging for independent use and/or may be integrated into other standard electronic devices, for example a cell phone, or personal digital assistant (PDA) etc. The different elements of the token device can be divided into 3 interface levels: the interface with the user, the interface with external devices such as a connected PC, and the interface with the smart card.

User Interface

In one embodiment of the smart card terminal/token device, the user interface has two elements—a display, and a keypad. The display may be a liquid crystal display (LCD) type although other display types and designs may also be substituted (for example a backlight display, LED display, etc.). The physical size of the display can be maximized with respect to the overall size of the token device, and special measures may be taken so that the glass is protected against breaking. The display should be easily legible for a user that sits in front of it, and can include a tilted or hinged display to facilitate viewing.

The keypad may be fabricated of a rubber or rubber-like flexible mat offering a good travel of the keys and tactile feedback. Other technologies can be considered. The functions of the keys should support the normal token device functions. Because most of these token devices may be used in non-professional (i.e. in the home, or on the road) environments the keys should be sufficiently large to allow easy handling. The design may take into account, where possible, that there are certain design considerations for physically handicapped people, like the size and type of keypad letters. All keys have their denomination imprinted in ink. The ink may be of a permanent type to prevent easy wipe out of the imprint. Alternatively, impressions may also be utilized (impression lettering, symbols, Braille, etc.). The function keys can have different colors. Smart grouping can limit the number of colors to reduce manufacturer costs. The ON/OFF key should be protected against an accidental, continuous ON state during transport. This helps to prevent unnecessary battery drain. The "5" key may have a reference mark for visually disabled people.

External Interface

A universal serial bus (USB) connection is optionally available for interface with a personal computer (PC). Alternatively, any of infra-red (IR), parallel, serial, or other connections may be implemented. The connector can be integrated into the token device housing. To support Plug & Play, in one embodiment, the port address and interrupt settings are automatically set by the PC. If the USB port of the PC is used, the token device will use the power coming from the USB bus. If required, power regulation circuits can be provided. If volume users (larger banks, etc.) consider the USB connection is not necessary for their particular application, then it may be left out.

Internal Device Characteristics

Figure 6:
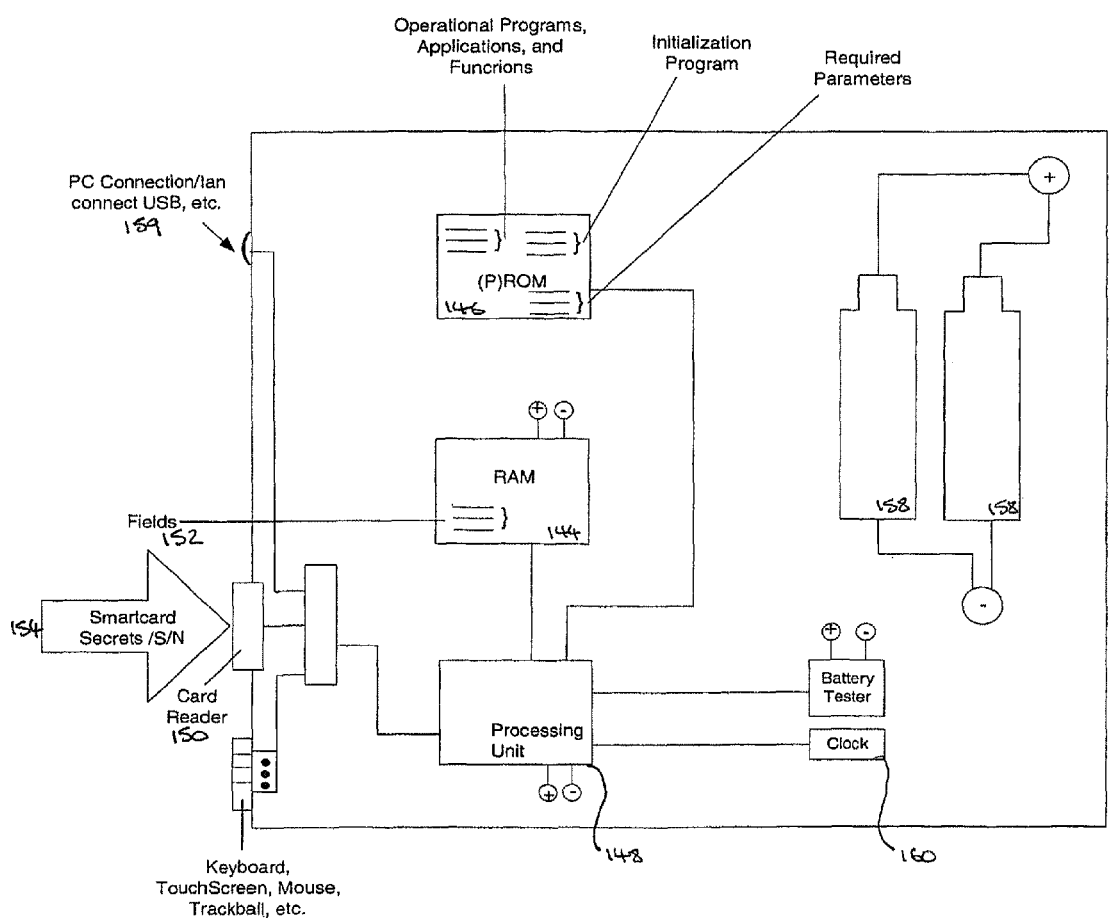
FIG. 6 is a schematic layout of a token device in accordance with an embodiment of the invention.

FIG. 6 illustrates schematically one embodiment of the smart card terminal and reader in accordance with the invention. An embodiment of the token device comprises a smart card reader 150 which has a slot to insert a standard smart card 154. Other smart card designs, shapes, etc. may be accommodated in alternate embodiments, while remaining within the spirit and scope of the invention. For maximum compatibility with current standards the smart card reader must accept full sized cards that conform to the International Standards Organization (ISO) 7810 specification. Ergonomically, positioning of the smart card reader follows 2 main criteria: it should be suitable for both left and right handed people; and it should not allow access at the top because the card opening will work as a dust aspirator and the accumulated dust will eventually cover the contacts, block the end-of-travel switch or de-align the contacts with the card.

Access from the front is one possible design solution since it allows the USB connection 159 to sit at the back pointing towards the PC. Arranging the connections in this way is automatically compatible with left or right handed people. Alternative positioning may also be utilized. The use of landing contacts is preferred to scraping contracts, as the landing contacts do not damage the gold plated contacts on the smart card. However, other contacts may be utilized. An end-of-travel switch continuously monitors the presence of the smart card in those applications or phases pre-set to work with the smart card. When using these types of applications a removal of the smart card halts the ongoing application immediately.

For proper operations with a PC, a suitable software driver must be delivered either to the bank or individually with each distributed token device. Drivers may be currently provided for Windows, Unix, OS/2, and NT systems. Other drivers may be provided as needed. Specialized applications and drivers may be stored in a combination of ROM 146 and RAM 144 memory, and accessed via a central processing unit 148. The central processing unit also monitors user input from a keyboard or touchscreen device 156.

The token device can interoperate with other special cards. Once in connected mode the token device can be designed to work with Java cards, and with Smart cards with cryptographic co-processor such as RSA cards.

In most instances it is preferred that the smart card should be well insertable into the token device to at least 75% of its overall size. Taking out the card is and easy push out or pull-out process. The card reader includes an end-of-travel switch to detect the correct insertion of the card, and to display the status of such on the display or as a computer application icon.

An internal clock 160 is required for token device time-dependent application such as time-based passwords, time based signatures etc. The internal clock is powered by an internal battery. The clock is internally set to Greenwich mean time (GMT) time during production.

The token device may be allowed to work in connected or non-connected mode. In the connected mode it gets its power from the USB port. In non-connected mode the token device works by getting power from the internal batteries 158. To allow exchange of the batteries without loss of memory, in one embodiment 2 independent batteries, each of 3 Volts, can be used. Typically, the batteries will already be in place at the moment of delivery to the user. In one embodiment, a plastic temporary insulation strip, accessible from the outside, can be removed after which the contacts close and the batteries becomes operational. This keeps the batteries in the best condition. In this embodiment, a couple of issues have to be carefully considered: the token device should be tested before the plastic is put in place; and, a scheme should be defined to set the clock to the correct GMT time. The battery status can be visualized through a menu item, and is some embodiments may be replaceable. A typical lifetime of the token device is at least 3 years.

Secure Applications

The secure applications of the token device are designed to be compatible with legacy systems and legacy tokens. This means that token device can handle:
  time or event based dynamic passwords
  fast and slow time changes
  challenge/response
  basic signatures
  extended signatures, even if concatenated In some embodiments the token device supports Data Encryption Standard (DES) and triple DES. In some embodiments, the token device also supports the PKA mechanism to unlock a secret that resides in encrypted mode on a PC. The exchange of the dynamic key between PC and token device can be automated if the two are linked via the USB. The token device may allow customers, using a smart card containing private keys and digital certificates on the smart card, to transfer these keys and certificates to the application in the PC. The fact that a PIN can be requested to open the token device and/or the smart card provides a double security mechanism.

Balance reader functions are functions that are accessible in a smart card, which don't require large applications. Typically, they show the balance of the amount in the electronic wallet; show the last five transactions; and control the locking and unlocking the electronic wallet. In some embodiments these functions are accessed by 1 or 2 direct access keys on the keypad. If this is not desired then they should be part of a user-accessible menu. One feature of the present invention as implemented in the electronic wallet variant provides for showing the current balance and the last five transactions, which displays in one continuous flow with a display pause of 3 seconds before going to the next entry.

A balance feature shows the current balance in the electronic wallet. As the token device is designed to be marketed worldwide, the currency may be shown behind the total. The information to derive which currency is used, can be found in the international currency value that is stored in the smart card. To reduce the incorporated translation database in the token device this value can be either prefixed during production or else the database can be limited to one country and eventually some important surrounding currencies. The last five transactions may be shown (credit as well as debit with the corresponding "+" (load) or "−" (payment) sign). The date of the transaction may also be shown. The order will typically be most recent transaction first. Partial transactions (such as telephone calls) will be shown as a single transaction. Once the last transaction is shown, the token device will halt showing information from the card. Alternate embodiments provide for any number of last transactions.

In one embodiment, a locking feature of the wallet is provided. A special icon on the display may show an open or closed lock depending on the state of the electronic wallet. Locking and unlocking will require a PIN entry for the smart card and may require writing to the smart card.

In one embodiment for use in Europe primarily, the token device includes a feature that is able to convert the Euro's form of currency to the old local (i.e. country-specific) currency. Access to this conversion feature is either through a menu item or through direct access via a dedicated key. The corresponding conversion factor is preferably programmable by the user. In that way users outside the Euro community can use it to convert to a desired local currency while traveling abroad. Alternatively, a table of conversion rates may be maintained in the token device. The table may be updated from an update card or connection to a web page having an updated table. In another alternative, the conversion factor can be programmed in ROM during the production process.

Device Security

The token device includes a variety of PIN management features. As the token device can be used as a standalone token device even without the smart card inserted, embodiments of the invention allow the token device to be secured with a PIN. In one example, a different PIN can be set for each of the maximum 4 users. The PIN length may be set between 2 and 8 digits. A factory default PIN can be set and a new PIN can be forced at initialization. As the token device is used together with a smart card, which in turn is also PIN protected, users may be tempted to use the same PIN for both. In one embodiment, in order to prevent that the PIN is retrieved by hacking the token device, the token device PINs are not saved in the memory of the token device. An unlock code for each of the 4 per-card supported users is provided.

Unlocking is possible only in those cases where the PIN of the token device is used and where the PIN is not handled by the smart card. In such cases the smart card may lock itself and the unlocking sequence will need to be followed as specified by the system owner.

The token device may contain a number of secrets, counters and initial vectors. In one embodiment of a typical token device, it may for example contain per user:

4 secrets keys of 64 or 128 bit
 1 unlock key valid for each of the users
 a signature of the PIN In one embodiment, the token device includes a true random generator that can be used to personalize the token device based on an historical secret. A smart card terminal/token device that is handed over to a customer cannot be used until it is personalized, i.e. it is converted from a regular smart card terminal or reader into an electronic smart card token. Personalization starts when a smart card is inserted. Depending on the wishes of the card organization the security level employed by the token device can vary from a "medium" to a "very high" level of security.

Medium Security Mode

Figure 8:
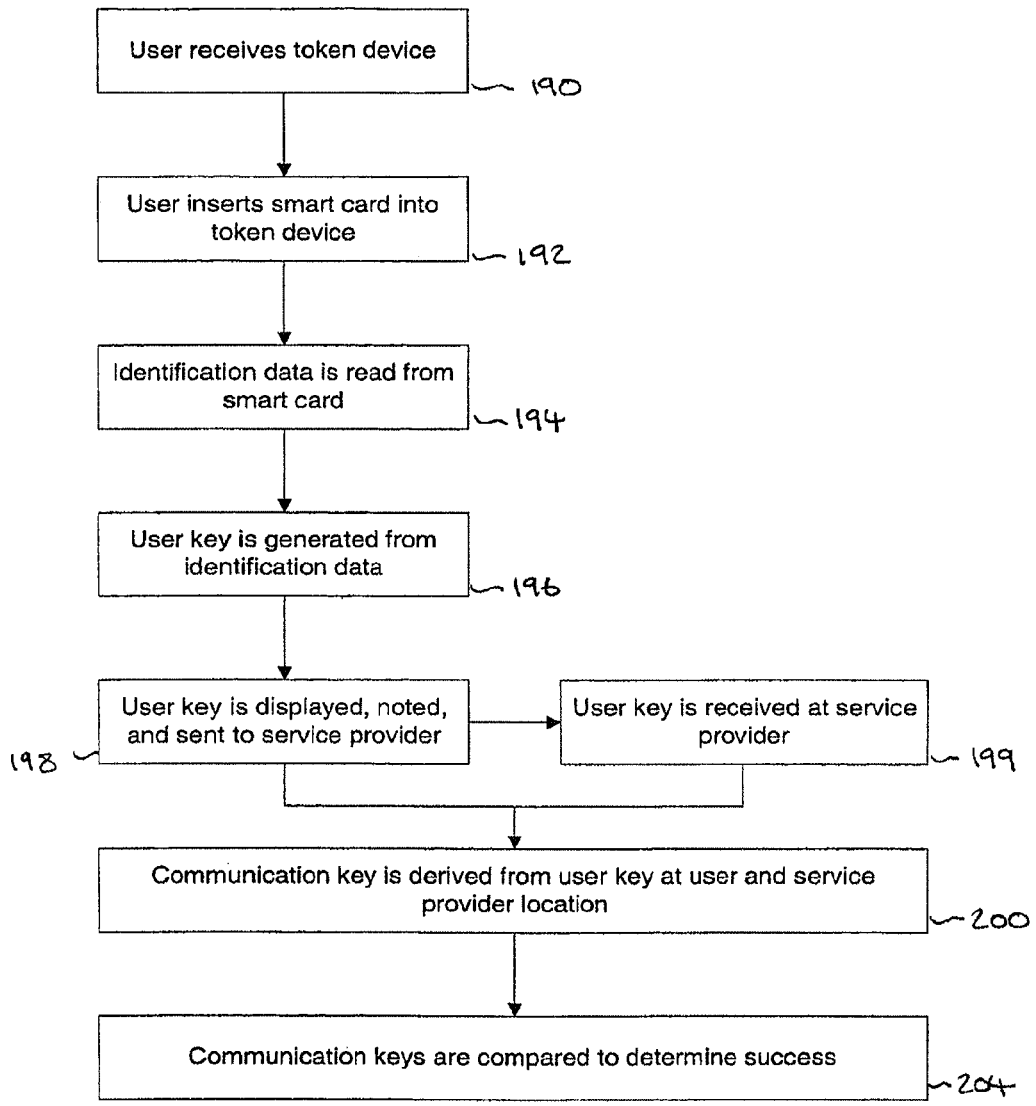
FIG. 8 is a flowchart of a token device medium security process in accordance with an embodiment of the invention.

A flowchart showing the operation of the medium security mode is shown in FIG. 8. The user obtains a generic smart card reader/token device (step 190) and their own personal smart card. The smart card is then inserted into the smart card reader (step 192) where the data can be read (step 194). In this security mode the token device random generator generates a one time "historical" secret that is displayed (step 196). The user notes down this value (step 198) and stores it for these cases where he/she gets a new token device or has to re-initialize the token device. In this way, the new token device will restore the secrets as they originally were in the initial token device without requiring any intervention in the server. The user also sends this value to the card organization or service provider. The card organization (for example, a bank) must introduce this value into their database and do the correct calculation with the secret key to derive at their end the derived key that the token device will use when it actually authenticates (step 200). The derived keys may be compared (step 202) to ensure user authentication (step 204). As there is a slight risk of exposure of the historical value, the security level is regarded as medium although any potential hacker would need to intercept this information during this single window in time and would also need the secret key in the card to be able to crack the system.

High Security Mode

Figure 9:
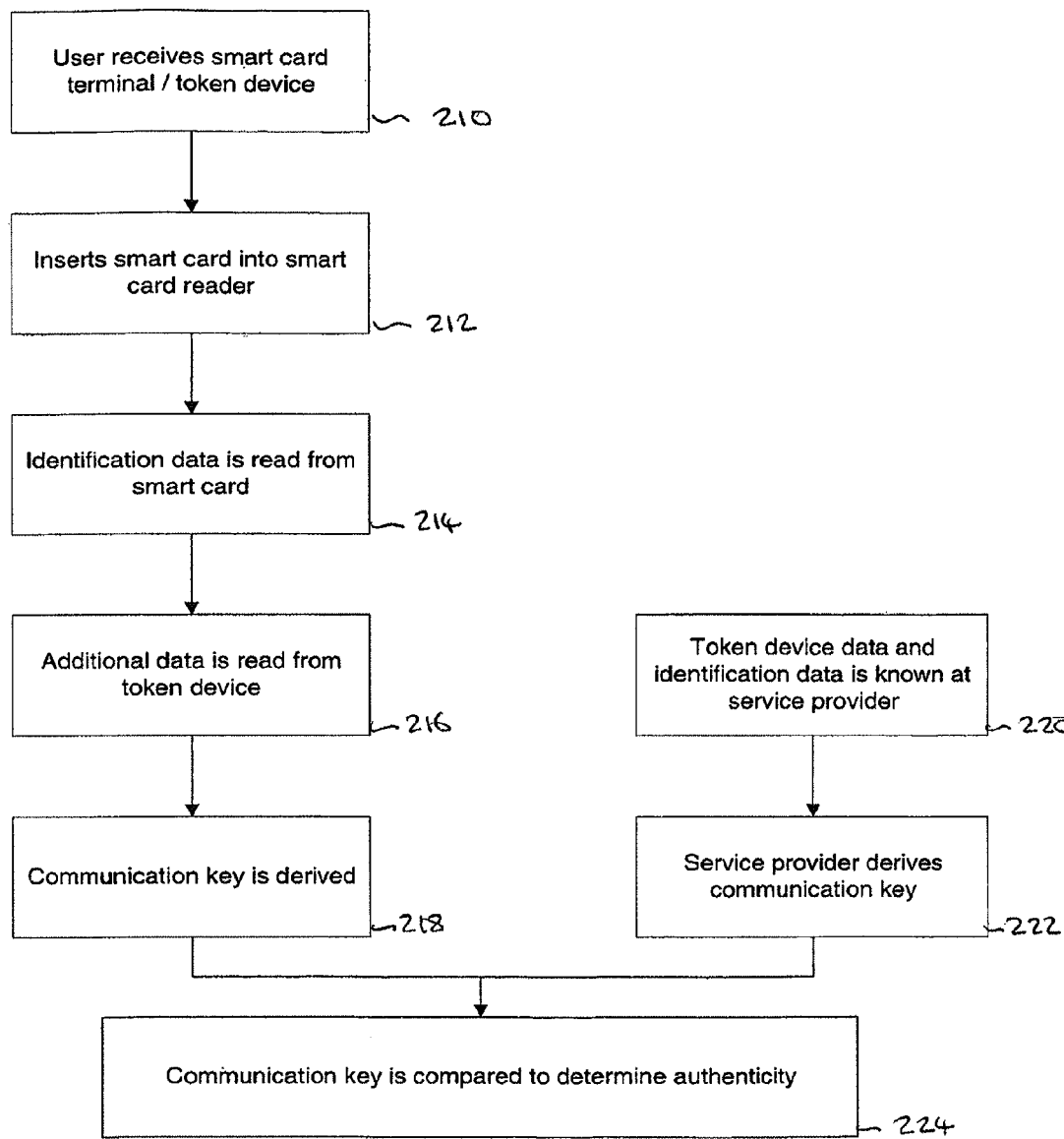
FIG. 9 is a flowchart of a token device medium-high security process in accordance with an embodiment of the invention.

A flowchart showing the operation of the medium security mode is shown in FIG. 9. Again, the user must first obtain a generic smart card reader/terminal device (step 210), smart card (step 212) and insert the smart card into the reader (step 214). In this security mode, the smart card is given a certain value (for example a serial number, an account number, a fixed or predefined value in the token device) as an input (step 216). This value is then used as input in the DES engine of the smart card together with one of the smart card secrets (address to be defined by the card operator) to derive a new value that will be stored in the RAM memory of the token device (step 218). From then on the token device will use this secret in the calculations. If this value is a value known by the service provider (step 220), they can derive the same token device key and store that in his database (step 222) to authenticate a user (step 224). This work can be done automatically.

Very High Security Mode

Figure 10:
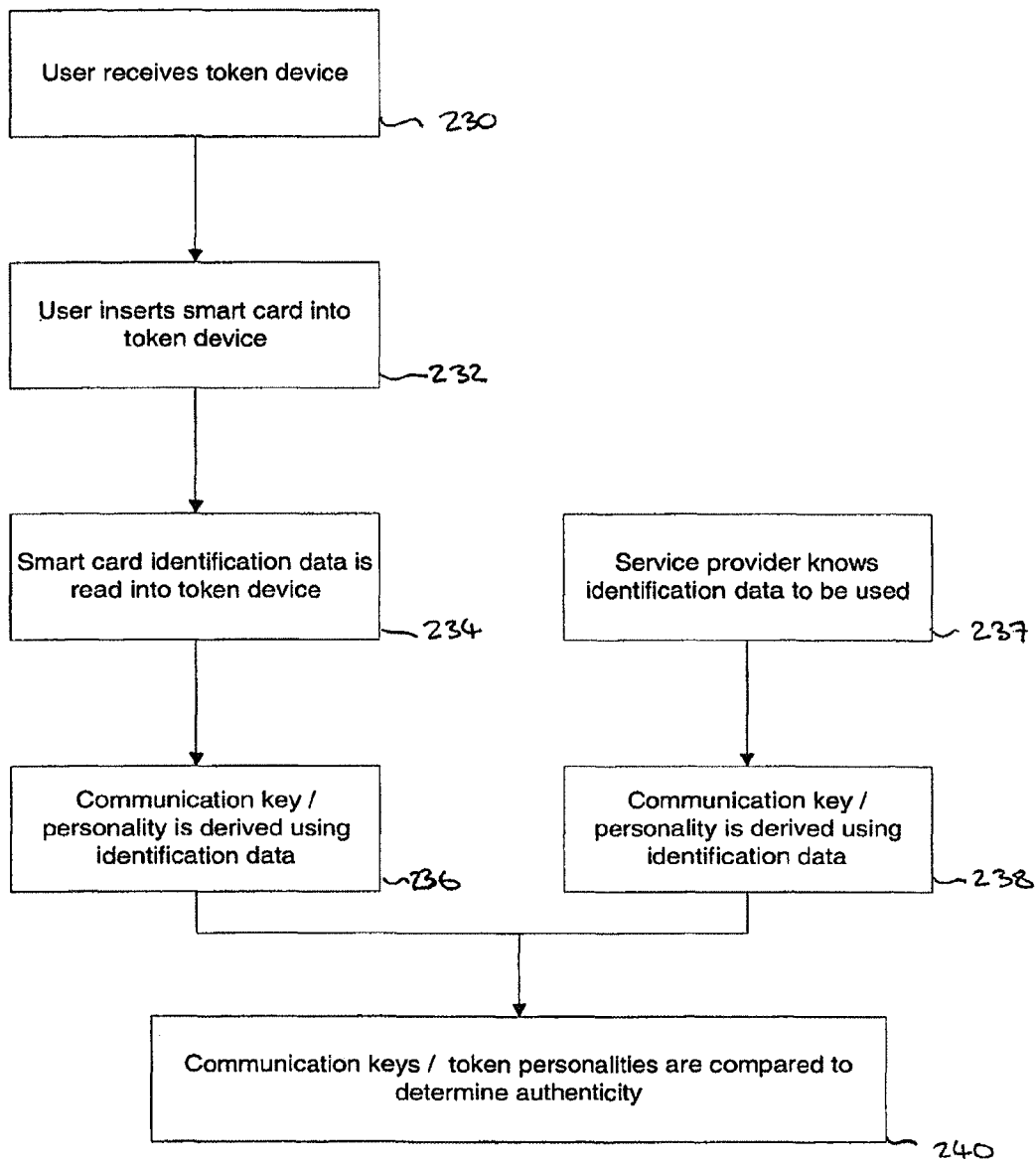
FIG. 10 is a flowchart of a token device high security process in accordance with an embodiment of the invention.

A flowchart showing the operation of the medium security mode is shown in FIG. 10. Again, the user must first obtain a generic smart card reader/terminal device (step 230), smart card (step 232) and insert the smart card into the reader (step 234). In this mode or security level, the token device uses the secrets embedded in the smart card all of the time (step 236). As these keys have to remain in the card, the smart card will have to do all the calculations. The card organization, system owner, or service provider can define which fields can be addressed and with what restrictions (on length, numeric, etc.). In this way the token device can work as a firewall, since the smart card can only be accessed via documented commands. The keys in the card can not be compromised and no other external keys are used. In fact the token device is initialized each time the smart card is introduced and the user can do a transaction on any token device issued by the smart card operator. As the service provider knows (step 238) which secret a customer will use, no extra work is required in the authentication center. The customer or transaction can then be authenticated (step 240).

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMs, microdrive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, retrieving user secrets from a smart card reader, automatically performing functions, setting security levels, managing electronic wallet accounts, managing different users, generating encrypted communications, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

For some customers, other embodiments of the invention provide for a token engine and technology integrated into a CPU on a smart card. This chip is then readable in existing smart card readers and uses the readers keyboard and display in combination to form a token device in accordance with the invention. There may be different types of token devices: token only, integrated with other smart cards, integrated with memory cards for cellular phones etc.

INDUSTRIAL APPLICABILITY

Any sector wanting to introduce strong authentication for network access based on smart cards can use the invention. The main trigger to use these smart cards is that there should be a sufficiently high issuance of smart cards or an important installed park of smart cards. Even if these cards were not originally designed for this application, the invention allows the use of embedded strings or secrets on the card to initialize itself in a unique way without compromising the security of the existing applications. Typical markets are primarily the banks having millions of smart cards issued or companies involved in smart card applications such as PKI security.

The advantage of the system is that with the invention there is no real need for a connected smart card reader. In an unconnected way the token device can be used on any platform (PC, Mac, phone, Internet, kiosk, etc) at any time and from any place simply because it works in an unconnected way. This lowers dramatically the reluctance level of users. But what is more important that it most certainly lowers the cost of ownership to the card issuers as the helpdesk is not overloaded with calls for new software drivers, other types of cables and from confused users not knowing how to connect the reader.

The invention claimed is:

1. A handheld electronic smart card terminal, comprising:
   a smart card reader for receiving and communicating with a smart card having smart card data stored thereon, said smart card comprising a cryptographic engine and said smart card data comprising a smart card secret;
   a token personality logic programmed based on the smart card data as a token device personality for offering the functionality of a strong authentication token, subsequent to insertion of the smart card in said smart card reader, wherein said smart card terminal obtains a secret device key from said smart card when received by said smart card reader by submitting to the smart card an input value for processing by the cryptographic engine using said smart card secret to derive the secret device key; and
   a communications mechanism for communicating authentication data derived from said token device personality to a user for transmission to an application provided by a service provider;
   wherein said smart card terminal is adapted to work at least in a non-connected mode; and
   wherein said smart card terminal further supports at least one of (i.) a security paradigm including at least a challenge response and a security paradigm including dynamic passwords based on at least a challenge input by the user and an event or (ii.) a security paradigm including dynamic signatures based on at least transaction data input by the user and an event.

2. The terminal of claim 1, further comprising means for erasing said token device personality when the smart card is removed from said smart card reader.

3. The terminal of claim 1, further comprising a unique terminal identifier associated with said smart card terminal.

4. The terminal of claim 1, further comprising: a computing mechanism and a memory device storing at least one terminal application for execution by said computing mechanism.

5. The terminal of claim 4, wherein said at least one terminal application is configured to accept a PIN from one of a set of terminal users, and provide access to other functions or applications on said terminal only to a user associated with the accepted PIN.

6. The terminal of claim 4, further comprising an interface, wherein said at least one terminal application includes a connected mode whereby said terminal acts as a slave to a client computer, connected to said interface.

7. The terminal of claim 6, wherein said interface comprises at least one of a scanning device or a universal serial bus port.

8. The terminal of claim 1, wherein said communications mechanism comprises a display.

9. The terminal of claim 1, wherein said communications mechanism communicates said authentication data in response to data input by the user.

10. The terminal of claim 1, further comprising a cryptographic engine for processing data using at least one of DES, Triple DES, or other encryption processes.

11. The terminal of claim 10, wherein the data being processed comprises transaction data input by the user and wherein the authentication data comprises a signature.

12. The terminal of claim 1, which further supports a security paradigm including at least event based passwords.

13. The terminal of claim 1, which further supports a security paradigm including at least signatures on transaction data.

14. A portable handheld smart card terminal device for use with a smart card, comprising:
- a memory;
- a smart card reading component adapted to receive and communicate with the smart card having the dimensions of a standard credit card, the smart card including a smart card secret and a cryptographic engine;
- a data processing component adapted to:
  - obtain a secret device key from the smart card when received by said smart card reading component by submitting to the smart card an input value for processing by the cryptographic engine using the smart card secret to derive the secret device key,
  - store the secret device key in said memory, and
  - calculate a signature using the stored secret device key, the signature to be used by the user to secure communication between the user and a service or application; and
- a display for displaying data to the user;
- wherein said smart card terminal device is adapted to work at least in a non-connected mode; and
- wherein at least one of (i.) the input value comprises a predefined values, (ii.) said smart card terminal device further supports a security paradigm including at least a challenge response and a security paradigm including dynamic passwords based on at least a challenge input by the user and an event or (iii.) said smart card terminal device further supports a security paradigm including dynamic signatures based on at least transaction data input by the user and an event.

15. The device of claim 14 further adapted to support DES (Data Encryption Standard) based calculations.

16. The device of claim 14 further adapted so that the secret device key is erased if the smart card is removed.

17. The device of claim 14 further comprising a keypad adapted for the user's entering data.

18. The device of claim 14 further adapted to allow the user to enter a PIN.

19. The device of claim 14 in which a PIN is associated with the smart card.

20. The device of claim 14 further adapted to receive via said keypad a PIN from the user to be handled by the smart card.

21. The device of claim 14 having a length that is less than 150% of the length of a standard credit card and a width that is less than 140% of the width of a standard credit card.

22. The device of claim 14 further comprising a USB (Universal Serial Bus) connector.

23. The device of claim 22, wherein the smart card terminal device is further adapted to work in a connected mode.

24. The device of claim 22 further comprising a firewall-like filter.

25. The device of claim 24 in which said firewall-like filter specifies specific smart card commands.

26. The device of claim 14 in which the inserted smart card is a personal smart card that has been issued by a financial institution.

27. The device of claim 14 in which the service or application comprises an internet banking service.

28. The device of claim 14 further adapted to support smart cards that are compliant with the EMV (Europay-Mastercard-VISA) standard.

29. The device of claim 14 which furthermore does not comprise any personalized data prior to the user inserting a smart card.

30. The device of claim 14 further comprising:
- a keypad adapted for the user's entering data, the data entered on the keypad comprising a PIN;
- wherein the data processing component is further adapted to erase the secret device key if the smart card is removed; and
- the device having a length that is less than 150% of the length of a standard credit card and a width that is less than 140% of the width of a standard credit card.

31. The device of claim 30 further comprising a connector for connecting the device to a personal computer and a firewall-like filter specifying specific smart card commands, the device further adapted to operate in both connected and non-connected mode.

32. The device of claim 31 in which said connector comprises a USB (Universal Serial Bus) connector.

33. The device of claim 30 in which the service or application comprises an internet banking service and in which the smart card comprises a personal smart card issued by a financial institution to the user.

34. The device of claim 30 further adapted to support smart cards that are compliant with the EMV (Europay-Mastercard-VISA) standard.

35. The device of claim 30 which furthermore does not comprise any personalized data prior to the user inserting a smart card.

36. The device of claim 30 wherein the PIN comprises a smart card PIN to be verified by the smart card.

37. A method of accessing a secure application, comprising the steps of:
(a) receiving a handheld generic smart card reader terminal adapted to work at least in a non-connected mode, wherein said generic smart card reader terminal comprises a smart card reader for receiving and communicating with a smart card, said smart card comprising a cryptographic engine, a processing unit responsive to said smart card reader, and a communications mechanism for communicating data derived from a token device personality to a user for said secure application;

(b) receiving at said smart card reader a user smart card having smart card data stored thereon, said smart card data comprising a smart card secret;

(c) generating said token device personality based on said smart card data stored on the smart card, wherein said smart card reader terminal obtains a secret device key from said smart card when received by said smart card reader by submitting to the smart card an input value for processing by the cryptographic engine using said smart card secret to derive the secret device key; and (d) accessing said secure application using authentication data derived from said token device personality, wherein said terminal is generic until said smart card is received in said smart card reader;

wherein at least one of (i.) a unique terminal identifier is associated with each smart card terminal, (ii.) said method further comprises the steps of entering data into the terminal, receiving a response, and communicating said response, wherein said data entered into the terminal include a personal identification number (iii.) said smart card terminal further supports a security paradigm including at least a challenge response and a security paradigm including dynamic passwords based on at least a challenge input by the user and an event or (iv.) said smart card terminal further supports a security paradigm including dynamic signatures based on at least transaction data input by the user and an event.

38. The method of claim 37, further comprising the step of erasing said token device personality when said smart card is removed from said smart card reader.

39. The method of claim 37, further comprising the step of copying said smart card data stored on the smart card to said smart card terminal.

40. The method of claim 37, further comprising the step of erasing said smart card data stored on the smart card when the smart card is removed from said smart card reader.

41. The method of claim 37 wherein said step of entering is performed via a keypad coupled to said terminal, and said step of receiving is performed via a display coupled to said terminal.

42. The method of claim 37, including the step of operating said terminal connected to a client computer.

43. The method of claim 42, further comprising at the terminal site:
receiving personal data from said client computer;
generating a response and
communicating said response to said secure application.

44. A method of providing a user with secure access to a service provider application, comprising:
distributing to a plurality of users a plurality of handheld smart card terminals, wherein each of said smart card terminals is adapted to work at least in a non-connected mode and comprises:
a smart card reader adapted to receive and communicate with a smart card,
a processor responsive to said smart card reader for generating a token device personality, and,
a communications mechanism;
allowing a first user of said plurality of users to generate with a first smart card terminal a token device personality for offering the functionality of a strong authentication token using user identification data stored on a first smart card, received at said smart card reader of said first smart card terminal, said first smart card comprising a cryptographic engine and storing a smart card secret, wherein said first smart card terminal obtains a secret device key from said first smart card when received by said smart card reader of said first smart card terminal by submitting to the first smart card an input value for processing by the cryptographic engine using said smart card secret to derive the secret device key; and,
granting said first user access to a secure application, using an element of said token device personality, said element being communicated to said first user via said communications mechanism of said first smart card terminal;
wherein at least one of (i.) the method further comprises the step of associating a unique terminal identifier with each smart card terminal, (ii.) each smart card terminal further supports a security paradigm including at least a challenge response and a security paradigm including dynamic passwords based on at least a challenge input by the user and an event or (iii.) each smart card terminal further supports a security paradigm including dynamic signatures based on at least transaction data input by the user and an event.

45. The method of claim 44, further comprising the step of erasing said token device personality when said smart card is removed from said smart card reader.

46. The method of claim 44, including operating said terminal connected to a client computer.

* * * * *